US012699839B2

(12) United States Patent
Gupta et al.

(10) Patent No.: US 12,699,839 B2
(45) Date of Patent: Aug. 4, 2026

(54) SYSTEM AND METHOD FOR EXTRACTING INFORMATION FROM PARTIAL IMAGES BASED ON TEXT STITCHING

(71) Applicant: Walmart Apollo, LLC, Bentonville, AR (US)

(72) Inventors: Rahul Kumar Gupta, Ballia (IN); Shilka Roy, Noida (IN); Sujit Jos, Ernakulam (IN)

(73) Assignee: Walmart Apollo, LLC, Bentonville, AR (US)

( * ) Notice: Subject to any disclaimer, the term of this patent is extended or adjusted under 35 U.S.C. 154(b) by 267 days.

(21) Appl. No.: 18/427,419

(22) Filed: Jan. 30, 2024

(65) Prior Publication Data

US 2024/0256774 A1      Aug. 1, 2024

Related U.S. Application Data

(60) Provisional application No. 63/441,895, filed on Jan. 30, 2023.

(51) Int. Cl.
*G06K 9/00*          (2022.01)
*G06F 40/232*          (2020.01)
(Continued)

(52) U.S. Cl.
CPC .......... *G06F 40/279* (2020.01); *G06F 40/232* (2020.01); *G06V 30/141* (2022.01); *G06V 30/1801* (2022.01); *G06V 30/245* (2022.01)

(58) Field of Classification Search
CPC ............. G06F 40/232; G06F 17/30253; G06F 40/279; G06V 30/245; G06V 30/10;
(Continued)

(56) References Cited

U.S. PATENT DOCUMENTS 11,775,749 B1     10/2023 Liu et al.
2011/0066424 A1     3/2011 Kurzweil et al.
(Continued)

OTHER PUBLICATIONS

Gromova, K., & Elangovan, V. (2022). Automatic extraction of medication information from cylindrically distorted pill bottle labels. Machine Learning and Knowledge Extraction, 4(4), 852-864. (Year: 2022).*

*Primary Examiner* — Gregory A Morse
*Assistant Examiner* — Kevin M Coomber
(74) *Attorney, Agent, or Firm* — DICKINSON WRIGHT RLLP; Hector A. Agdeppa

(57) ABSTRACT

A computer-implemented method including detecting respective one or more text boxes in each of multiple partial images of a text-bearing area. The method also can include determining respective one or more edge text boxes of the respective one or more text boxes in each of overlapping partial images of the multiple partial images, wherein each of the respective one or more edge text boxes comprise a respective incomplete text. The method additionally can include matching one or more pairs of corresponding edge text boxes from the respective one or more edge text boxes of two adjacent images of the overlapping partial images of the multiple partial images. The method also can include determining cross-image texts in the one or more pairs of the corresponding edge text boxes. The method further can include determining one or more entities in the text-bearing area based on entity texts of the cross-image texts and non-edge texts in respective one or more non-edge text boxes of the respective one or more text boxes in the multiple partial images. Other embodiments are described.

20 Claims, 5 Drawing Sheets

(51) Int. Cl.

*G06F 40/279* (2020.01)
*G06V 30/14* (2022.01)
*G06V 30/18* (2022.01)
*G06V 30/244* (2022.01)

(58) Field of Classification Search

CPC .............. G06V 30/1801; G06V 10/44; G06V
30/18076; G06V 30/141; G16H 20/10
See application file for complete search history.

(56) References Cited

U.S. PATENT DOCUMENTS

| | | | |
|---|---|---|---|
| 2016/0267357 A1* | 9/2016 | Smith | ..................... G16H 10/60 |
| 2019/0213408 A1 | 7/2019 | Cali et al. | |
| 2020/0257917 A1* | 8/2020 | Moore | ................... H04N 7/188 |
| 2021/0034907 A1* | 2/2021 | Dugar | ................ G06Q 30/0603 |
| 2023/0298374 A1 | 9/2023 | Kong et al. | |

* cited by examiner

Figure 4:
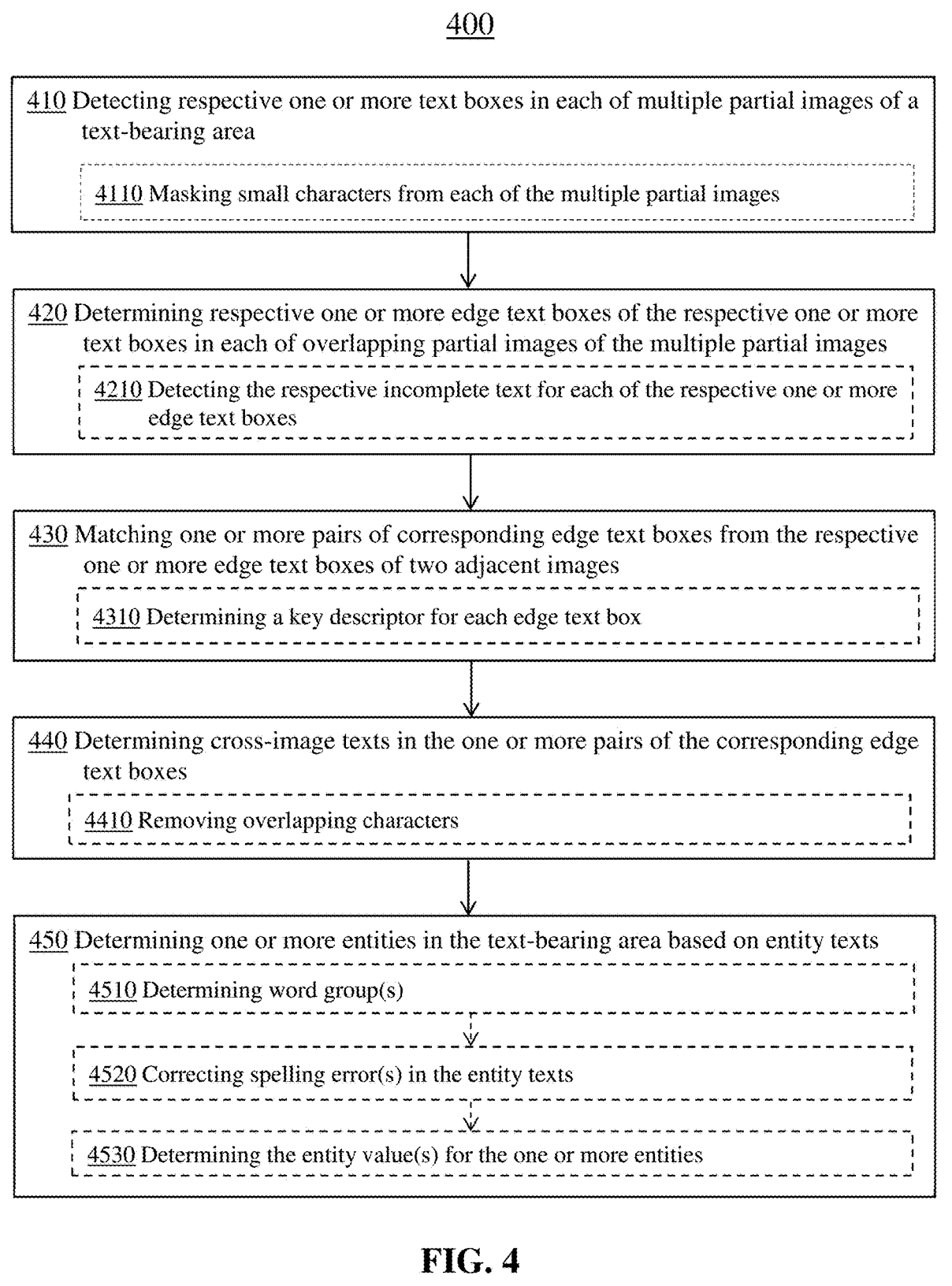

400

410 Detecting respective one or more text boxes in each of multiple partial images of a text-bearing area > 4110 Masking small characters from each of the multiple partial images 420 Determining respective one or more edge text boxes of the respective one or more text boxes in each of overlapping partial images of the multiple partial images > 4210 Detecting the respective incomplete text for each of the respective one or more edge text boxes 430 Matching one or more pairs of corresponding edge text boxes from the respective one or more edge text boxes of two adjacent images > 4310 Determining a key descriptor for each edge text box 440 Determining cross-image texts in the one or more pairs of the corresponding edge text boxes > 4410 Removing overlapping characters 450 Determining one or more entities in the text-bearing area based on entity texts > 4510 Determining word group(s)

> 4520 Correcting spelling error(s) in the entity texts

> 4530 Determining the entity value(s) for the one or more entities

510 Receiving, via a computer network, multiple partial images of a pill bottle from a user device 520 Determining one or more entities from the multiple partial images 530 Generating a refill prescription order based on the one or more entities 540 Causing a filling of the refill prescription order

SYSTEM AND METHOD FOR EXTRACTING INFORMATION FROM PARTIAL IMAGES BASED ON TEXT STITCHING

CROSS-REFERENCE TO RELATED APPLICATIONS

This application claims the benefit of U.S. Provisional Application No. 63/441,895, filed Jan. 30, 2023. U.S. Patent Application No. 63/441,895 is incorporated herein by reference in its entirety.

TECHNICAL FIELD

This disclosure relates generally to extracting information from partial images based on text stitching.

BACKGROUND

Various applications ask users to upload images of pull bottles taken from multiple sides of the bottle. After the prescription images are uploaded, conventional approaches to processing the images involve attempting to stitch the images together, which often fails. For example, stitching has many limitations and challenges, such as image alignment and orientation problems. Moreover, entity extraction of information from the images is often done manually.

BRIEF DESCRIPTION OF THE DRAWINGS

To facilitate further description of the embodiments, the following drawings are provided in which:

FIG. 4 illustrates a flow chart for a method of extracting information from multiple partial images, according to an embodiment.

Figure 1:
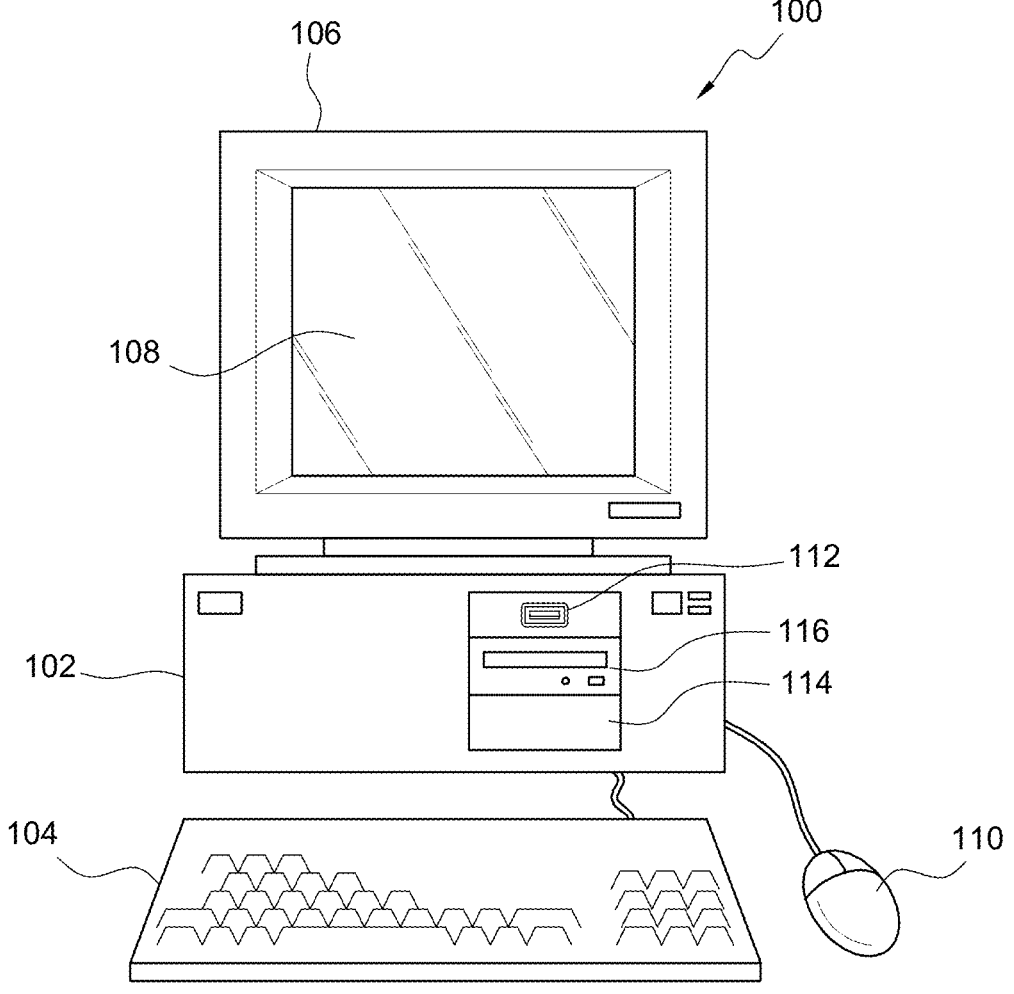
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, ten seconds, thirty seconds, one minute, five minutes, ten minutes, etc.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
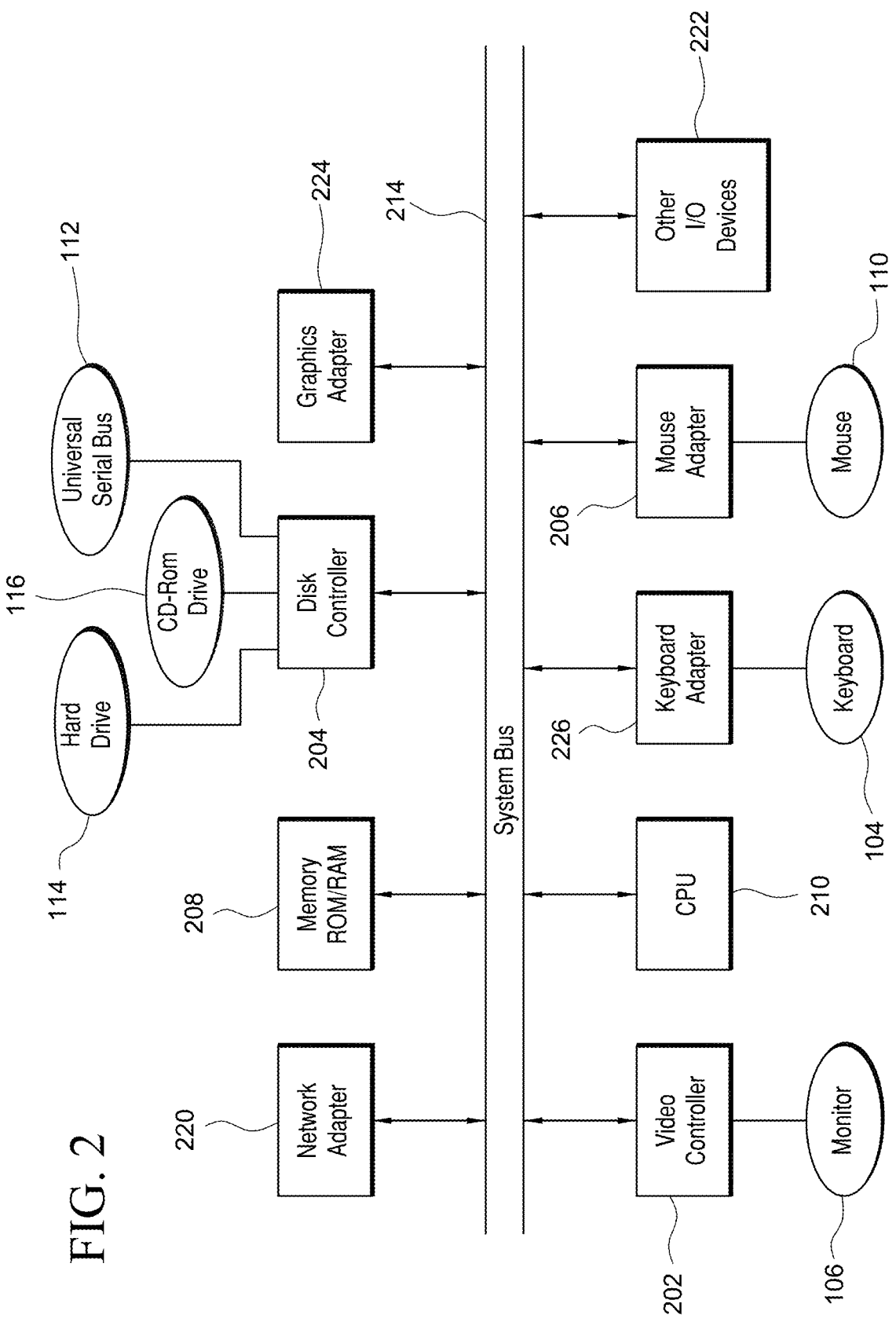
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
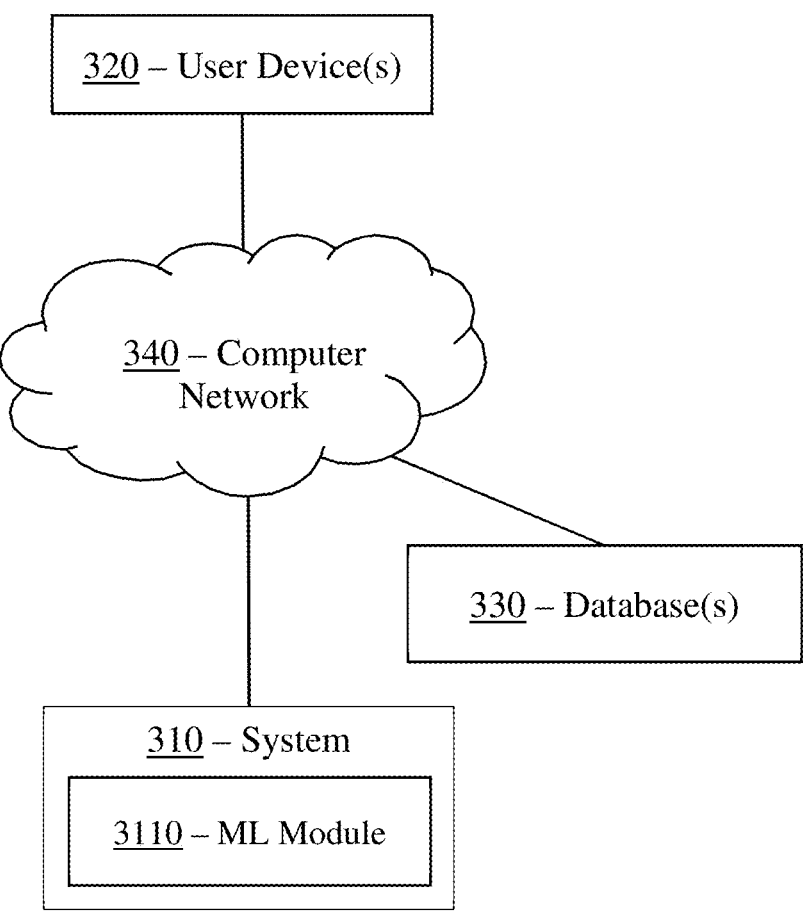
FIG. 3 illustrates a block diagram of a system that can be employed for extracting information from multiple partial images, according to an embodiment.

Turning ahead in the drawings, FIG. 3 illustrates a block diagram of a system 300 that can be employed for extracting information from multiple partial images, according to an embodiment. In various embodiments, the partial images can include photos of a continuous surface with texts. For example, the surface can include a label on a cylindrical object (e.g., a pill bottle, a water bottle, a pole, etc.). The photos can be taken via a camera or a smart phone by a consumer and thus may not be fully aligned. Further, the texts can include information, such as one or more entities. For example, the entities can include a drug's name, a date, a dosage or quantity, a patient's name, active ingredients, directions, pharmacy information, etc. about the prescription and/or drugs in a pill bottle. Some of the information can be useful while others can be useless or irrelevant for specific applications. For example, for an wellness app configured to remind a patient to take medicine or a system for a pharmacy to accept a transferred prescription request, the patient can take photos of a pill bottle to show the label, and some information (e.g., warnings, adverse reactions, etc.) can be of little or less value for such an app or system, compared to other information, such as the drug's name, the dosage or quantity, or the frequency (e.g., daily or after every mean, etc.).

System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein. In many embodiments, operators and/or administrators of system 300 can manage system 300, the processor(s) of system 300, and/or the memory storage unit(s) of system 300 using the input device(s) and/or display device(s) of system 300, or portions thereof in each case.

In many embodiments, system 300 can include a system 310, a user device(s) 320, and/or a database(s) 330. System 310 further can include one or more elements, modules, or systems, such as an ML module 3110 trained to perform various procedures, processes, and/or activities of system 300 and/or system 310. System 310, user device(s) 320, and/or ML module 3110 can each be a computer system, such as computer system 100 (FIG. 1), as described above, and can each be a single computer, a single server, or a cluster or collection of computers or servers, or a cloud of computers or servers. In another embodiment, a single computer system can host system 310, user device(s) 320, and/or ML module 3110. Additional details regarding system 310, user device(s) 320, and ML module 3110 are described herein.

In some embodiments, system 310 can be in data communication with user device(s) 320, using a computer network (e.g., computer network 340), such as the Internet and/or an internal network that is not open to the public. Meanwhile, in many embodiments, system 310 also can be configured to communicate with and/or include a database(s) 330. In some embodiments, database(s) 330 can include one or more dictionaries (e.g., an English dictionary, a drugs dictionary, a human name dictionary, etc.) for a pharmacy that contains common English words, drug names, and human names, for example, among other data as described herein. In another example, database(s) 330 further can include training data (e.g., first names, last names, etc.) and/or hyper-parameters for training and/or configuring system 310 and/or ML module 3110.

In a number of embodiments, database(s) 330 can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more data sources, that particular database can be stored on a single memory storage unit or the contents of that particular database can be spread across multiple ones of the memory storage units storing the one or more databases, depending on the size of the particular database and/or the storage capacity of the memory storage units. In similar or different embodiments, the one or more data sources can each be a computer system, such as computer system 100 (FIG. 1), as described above, and can each be a single computer, a single server, or a cluster or collection of computers or servers, or a cloud of computers or servers.

Database(s) 330 can include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In many embodiments, communication between system 310, user device(s) 320, and/or database(s) 330 can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.)

and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc.

The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can recognize information or entities from multiple partial images by text stitching techniques. The multiple partial images can each show a part of a continuous surface with a text-bearing area including texts and/or images, and the multiple partial images can be taken and/or received in a predefined sequence (e.g., from left to right horizontally or from top to bottom vertically, etc.) or in an unknown sequence. Two of the multiple partial images that are adjacent in sequence can overlap partially so that no texts are lost. In a number of embodiments, system 310 can detect respective one or more text boxes in each of the multiple partial images within the text-bearing area. Each of the one or more text boxes can include one or more characters (e.g., letters, numerical digits, and/or punctuation marks) that are grouped together, and each text box can be separated from another one of the one or more text boxes in the same line by a blank and/or located adjacent to a side edge (e.g., a top, bottom, left, or right side edge) of a partial image.

In some embodiments, in order to detect the respective one or more text boxes in each of the multiple partial images, system 310 can detect respective characters in each of the multiple partial images. Meanwhile, system 310 can ignore or disregard small characters in the multiple partial images because sometimes the seemingly small characters include noises (e.g., stains misidentified as characters) and also because texts with small characters generally include information that is less significant (e.g., warnings, adverse reactions, or symptoms of drug overdose for prescription drugs), compared to the information shown in larger characters (e.g., the patient's name, the drug name, etc.). System 310 can mask the small characters in each of the multiple partial images before or after the respective characters are detected in each of the multiple partial images. In some embodiments, system 310 can determine small characters, relative to the remaining characters, of the respective characters in each of the multiple partial images based on a respective font-size threshold for each of the multiple partial images. Each of the small characters, as determined, can include a respective font size less than the respective font-size threshold for each of the multiple partial images.

System 310 can determine the respective font-size threshold based on any suitable methods. In a number of embodiments, system 310 can convert each of the multiple partial images into a respective binary image, using any suitable methods (e.g., Otsu's thresholding method, or adaptive thresholding methods, etc.). After a partial image is converted to the respective binary image, system 310 further can detect a respective character contour in the respective binary image for each of the respective characters, via any suitable contour detection methods (e.g., class-cv contour detection, or Canny edge detection, etc.). In some embodiments, system 310 additionally can determine: (a) a respective font size of each of the respective characters based on the respective character contour for each of the respective characters, as detected, and (b) the respective font-size threshold for each of the multiple partial images based on the respective font size of each of the respective characters. For example, in several embodiments, the respective font-size threshold can be determined based on an average font size or a distribution of the respective font size in the partial image (e.g., a font size greater than 50%, 75%, or 83% of the respective characters, etc.). In certain embodiments, the respective font-size threshold can be determined based on the largest font in the partial image (e.g., ½, ⅓, or ¼ of the largest font size).

In a number of embodiments, once the small characters are determined, system 310 further can mask the small characters from each of the multiple partial images, and after masking, determine the respective one or more text boxes for remaining characters of the respective characters that are not masked in each of the multiple partial images, via any suitable methods. For example, system 310 can determine the respective one or more text boxes and recognize texts for the remaining characters by any suitable real-time Optical Character Recognition (OCR) techniques, algorithms, modules, and/or systems (e.g., pattern recognition-based OCRs, feature-recognition-based OCRs, or neural networks-based OCR, iterative OCRs, etc.). In certain embodiments, the OCR modules for system 310 (e.g., Azure OCR, Google OCR, or Tesseract OCR, etc.) can determine the respective one or more text boxes based on the respective contours and coordinates of the remaining characters. In some embodiments, system 310 can be advantageous in that system 310 determines the respective one or more text boxes and recognize the texts only for the remaining characters, after the small characters are masked, because it can save time for performing generally complicated and time-consuming OCR on the small characters that include information of less importance or significance for a user. In similar or different embodiments, system 310 can determine the respective one or more text boxes and recognize the texts, via OCR, without masking the small characters.

Still referring to FIG. 3, in some embodiments, some of the respective one or more text boxes of a partial image can be located at a side edge of the partial image, and the texts in these text boxes can be incomplete and include at least one, but not all, of the characters in the original texts. These broken text boxes can be referred to as edge text boxes, and the texts in these edge text boxes can be referred to as cross-image texts. In a number of embodiments, system 310 further can determine the respective one or more edge text boxes of the respective one or more text boxes in each of overlapping partial images of the multiple partial images, and each of the respective one or more edge text boxes can include a respective incomplete text. Each of the multiple partial images can overlap partially with another one of the multiple partial images. Sometimes, not all of the multiple partial images include edge text boxes. For example, if the multiple partial images are taken for a label of a bottle, and the label includes blank columns, some of the multiple partial images may include side edges on the blank columns.

System 310 can determine the respective one or more edge text boxes in any suitable methods. In several embodiments, system 310 can determine the respective one or more edge text boxes in each of the overlapping partial images by detecting a respective incomplete text for each of the respective one or more edge text boxes based on a respective distance between the respective incomplete text and a side edge (e.g., a top, bottom, left, or right edge) of each of the overlapping partial images of the multiple partial images. For example, a text box of the respective one or more edge boxes can be an edge box if the text box is adjacent to a right edge of a partial image and encloses a text with a rightmost character whose distance to the right edge is zero (e.g., a broken character) or less than a character-to-character distance threshold (e.g., 1-5 pixels). The character-to-character distance threshold can be determined based on any suitable techniques (e.g., an average character-to-character distance among the characters of the text, or the character-to-character distance between the rightmost character and the preceding or second-rightmost character, etc.).

In many embodiments, system 310 further can match one or more pairs of corresponding edge text boxes from the respective one or more edge text boxes of two adjacent images of the overlapping partial images of the multiple partial images. Matching the one or more pairs of the corresponding edge text boxes from the respective one or more edge text boxes of the two adjacent images of the overlapping partial images of the multiple partial images can include: (a) extracting a respective key descriptor for each of the respective one or more edge text boxes of the two adjacent images; and (b) determining whether a first edge text box of the respective one or more edge text boxes of a first partial image of the two adjacent images matches a second edge text box of the respective one or more edge text boxes of a second partial image of the two adjacent images based on a feature distance between the respective key descriptor for the first edge text box and the respective key descriptor for the second edge text box. When the first edge text box, as determined, matches the second edge text box, the first edge text box and the second edge text box combined can constitute one of the one or more pairs of the corresponding edge text boxes.

In some embodiments, system 310 can extract a respective key descriptor for each of the respective one or more edge text boxes by any suitable methods (e.g., Scale Invariant Feature Transform (SIFT), Speeded-Up Robust Features (SURF), Oriented FAST and Rotated BRIEF (ORB), Accelerated Kaze (AKAZE), or Histogram of Oriented Gradients (HOG), etc.). System 310 further can determine the first edge text box that matches the second edge text box based on any suitable feature-matching techniques (e.g., brute force feature matching, K-Nearest Neighbor (KNN) feature matching, brute force-based KNN feature matching, or Fast Library for Approximate Nearest Neighbors (FLANN) feature matching, etc.). In certain embodiments, system 310 can determine that the first edge text box, among all of the respective one or more edge text boxes of the first partial image, best matches the second edge box of the second partial image based on the feature distance (e.g., an Euclidean distance, etc.) between the first edge box and the second edge box. In a few embodiments, system 310 can determine that the first edge text box is one of the K (e.g., 2, or 3, etc.) first candidate edge text boxes of the respective one or more edge text boxes of the first partial image that best match the second edge text box of the second partial image, and the first edge text box can be determined to be a valid match for the second edge text box based on any suitable techniques (e.g., a ratio test for convergence with a ratio threshold of 0.7, 0.75, 0.80, or 0.85, etc.).

In several embodiments, if the sequence of the multiple partial image transmitted or provided to system 310 is unknown, system 310 further can determine the sequence based on the one or more pairs of the corresponding edge text boxes, as matched, of each pair of the overlapping partial images.

Still referring to FIG. 3, in many embodiments, once the one or more pairs of the corresponding edge text boxes of the two adjacent partial images are matched, system 310 further can determine the cross-image texts in the one or more pairs of the corresponding edge text boxes. Determining the cross-image texts can include removing overlapping characters from the one or more pairs of the corresponding edge text boxes. Because for a pair of the corresponding edge text boxes to partially overlap at the overlapping characters, the overlapping characters generally would include the prefix of a first (e.g., left) edge text box of the pair of the corresponding edge text boxes and the suffix of a second (e.g., right) edge text box of the pair of the corresponding edge text boxes, the overlapping characters can constitute a respective matching prefix-suffix pair of the pair of the corresponding edge text boxes. As such, removing overlapping characters can be based on the respective matching prefix-suffix pair. For example, when a pair of the corresponding edge text boxes includes a first edge text box with a first text, "EVER", and a second edge text box with a second text, "ERY", the respective matching prefix-suffix pair can include the overlapping characters, "ER", and the cross-image text can be determined to be "EVERY" by removing "ER" from both the first edge text box and the second edge text box. In many embodiments, after the edge text boxes of adjacent partial images are matched, sentences can be formed from texts in the multiple partial image.

Still referring to FIG. 3, in a number of embodiments, system 310 further can determine one or more entities in the text-bearing area based on entity texts of the cross-image texts and non-edge texts in respective one or more non-edge text boxes of the respective one or more text boxes in the multiple partial images. Determining the one or more entities can include determining one or more word groups based on the cross-image texts and the non-edge texts, using any suitable natural language processing (NLP) techniques or modules. An exemplary word group can include a term, a phrase, or one or more sentences. Each of the entity texts can include a corresponding word (e.g., a continuous series of characters without any blank in between) or a word group.

In some embodiments, system 310 can determine the one or more entities by (a) detecting one or more entity signals for the one or more entities based on: (i) a keyword or a pattern of each of the entity texts; and/or (ii) a machine learning module pre-trained to determine whether a text of the entity texts comprises an entity signal of the one or more entity signals; and (b) determining one or more entity values for the one or more entities based on the one or more entity signals. For example, system 310 can detect an entity signal based on a keyword (e.g., a drug name, a unit for dosage or quantity, a first name, a last name, etc.) by performing a text search (e.g., a conventional text search or a fuzzy text search) in a table, corpus, or dictionary (e.g., a table of units generally used in a domain, a dictionary of first and/or last names, or a drug corpus in database(s) 330, etc.), using any suitable data structure (e.g., Trie data structure, etc.). System 310 also can detect an entity signal based on a pattern of the entity text using a regular expression (Regex)-based pattern matching. For example, system 310 can adopt a customized Regex matching module to define a pattern and detect an entity when the entity text (e.g., a phone number, a dosage or quantity, or a direction statement, etc.) matches the pattern. In certain embodiments, system 310 further can use a trained machine learning module (e.g., ML module 3110, a pre-trained BERT-based module, or Conditional Random Field (CRF) model, etc.) to detect an entity signal from the text (e.g., a person's name, etc.).

In a few embodiments, after the entity signal is detected, system 310 further can determine the entity value for the entity associated with the entity signal. For example, when system 310 detects, via text searching, Regex-based pattern matching, or machine learning, that the entity text includes a drug name or a person's name, system 310 can determine that the drug name or the person's name in the entity text is the entity value. In some embodiments, determining the one or more entity values can include performing a Regex-based extraction on the entity texts based on the one or more entity signals. For example, when an entity signal (e.g., a unit for drug dosage) is detected, system 310 can determine, based on the Regex pattern associated with the entity signal (e.g., a dosage value D followed by a dosage unit U, where D is a digital number and U is one of predefined units, such as "Mg", "Mcg", etc.), that the entity value (e.g., the dosage) is the digital number in the entity text that is followed by the unit.

In many embodiments, before determining the one or more entities, system 310 additionally can correct one or more spelling errors in the entity texts by any suitable spell checking and correcting techniques (e.g., dictionary-based, similarity metrics-based, Finite State Automata (FSA)-based, clustering-based spell checking, etc.).

Turning ahead in the drawings, FIG. 4 illustrates a flow chart for a method 400 of extracting information from multiple partial images, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) or system 310 (FIG. 3) (including one or more of its elements, modules, and/or systems, such as ML module 3110 (FIG. 3)) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3) or system 310 (FIG. 3). The processor(s) can be similar or identical to the processor(s) described above with respect to computer system 100 (FIG. 1).

Referring to FIG. 4, method 400 can include an activity 410 of detecting respective one or more text boxes in each of multiple partial images of a text-bearing area. In many embodiments, activity 410 further can include one or more pre-processing activities, such as an activity 4110 of masking small characters that generally can include information of less importance for a specific application from each of the multiple partial images before the one or more activities for determining the respective one or more text boxes for the remaining characters that are not masked.

In a number of embodiments, activity 4110 further can include: (a) detecting respective characters in each of the multiple partial images; and (b) determining the small characters of the respective characters in each of the multiple partial images based on a respective font-size threshold that can be similar or different for each of the multiple partial images. Detecting the respective characters in each of the multiple partial images can include: (a) converting each of the multiple partial images into a respective binary image by any suitable techniques (e.g., Otsu's thresholding method); and (b) detecting a respective character contour (e.g., using cv contour detection) in the respective binary image for each of the respective characters. Further, determining the small characters of the respective characters in each of the multiple partial images can include: (a) determining a respective font size of each of the respective characters based on the respective character contour for each of the respective characters; and (b) determining the respective font-size threshold for determining the small characters for each of the multiple partial images based on the respective font size of each of the respective characters (e.g., the distribution of the respective font size) in each of the multiple partial images.

In some embodiments, method 400 further can include an activity 420 of determining respective one or more edge text boxes of the respective one or more text boxes in each of overlapping partial images of the multiple partial images. Activity 420 further can include an activity 4210 of detecting a respective incomplete text for each of the respective one or more edge text boxes. A text in a text box can be deemed incomplete when the distance between the text and a side edge of a partial image is less than a respective threshold (e.g., 1-3 pixels, or an average character-to-character distance between the characters of the text, etc.) for the partial image.

Still referring to FIG. 4, in a number of embodiments, method 400 further can include a 430 of matching one or more pairs of corresponding edge text boxes from the respective one or more edge text boxes of two adjacent images (e.g., adjacent in sequence) of the overlapping partial images of the multiple partial images. Matching the one or more pairs of the corresponding edge text boxes in activity 430 additionally can include determining whether a first edge text box of the respective one or more edge text boxes of a first partial image of the two adjacent images matches a second edge text box of the respective one or more edge text boxes of a second partial image of the two adjacent images based on any suitable approaches (e.g., a brute force-based KNN feature matching). When the first edge text box, as determined, matches the second edge text box, one of the one or more pairs of the corresponding edge text boxes comprises the first edge text box and the second edge text box.

In some embodiments, activity 430 further can include an activity 4310 of determining a respective key descriptor (e.g., a SIFT key descriptor) for each of the respective one or more edge text boxes of two adjacent images. In many embodiments, a feature distance between the respective key descriptor for the first edge text box and the respective key descriptor for the second edge text box can be used for determining whether the first edge text box matches the second text box. In several embodiments, the feature distance, as determined, can be further verified (e.g., using a ratio test for the convergence of the multiple matched candidate edge text boxes) before activity 430 determines that the first edge text box matches the second text box.

Still referring to FIG. 4, method 400 further can include an activity 440 of determining cross-image texts in the one or more pairs of the corresponding edge text boxes. In a number of embodiments, activity 440 further can include an activity 4410 of removing overlapping characters from each pair of the corresponding edge text boxes before determining the cross-image texts. The overlapping characters can constitute a respective matching prefix-suffix pair of each of the one or more pairs of the corresponding edge text boxes.

In many embodiments, method 400 further can include an activity 450 of determining one or more entities in the text-bearing area based on entity texts of the cross-image texts in the edge text box(es) and the non-edge texts in the non-edge text box(es) in the multiple partial images. In a number of embodiments, activity 450 further can include an activity 4510 of determining one or more word groups based on the cross-image texts and the non-edge texts, using any suitable NLP techniques (e.g., Regex-based extraction or ML module 3310 (FIG. 3)). The entity texts each can include a word or a word group. In several embodiments, activity 450 also can include an activity 4520 of correcting any spelling errors in the entity texts. In many embodiments, activity 450 further can include activity 4530 of determining a respective entity value for each of the one or more entities.

Activity 4530 further can include: (a) detecting one or more entity signals for the entities based on one or more of: (i) a keyword or a pattern in each of the entity texts; or (ii) a machine learning module (e.g., a BERT module, ML module 3110 (FIG. 3)) pre-trained to determine whether a text of the entity texts comprises an entity signal of the one or more entity signals; and (b) determining the entity values for the entities based on the one or more entity signals (e.g., performing a Regex-based extraction on the entity texts based on the one or more entity signals).

For example, in an embodiment for recognizing entities on the label of a pill bottle, activity 450 can include one or more of the following activities. To detect a potential drug name in an entity text, activity 450 can include pre-processing the words in the entity text (e.g., performing spell check based on a drug corpus in database(s) 330 (FIG. 3) in activity 4520), and/or removing common English dictionary words from the entity text. Activity 450 further can include searching the entity text with the remaining word(s) in the drug corpus using fuzzy matching. Activity 450 can use Trie data structure to reduce search time. Further, to detect a dosage or quantity of the medicine in an entity text, activity 450 can include searching one or more predefined keywords (e.g., "Mg", "Mcg", and/or "qty") in the entity text and using a regular expression (Regex) for the entity text to determine an entity value based on a word preceding the keyword found in the entity text.

Moreover, to detect a patient's or a doctor's name in an entity text, activity 450 can include searching a corpus of first names and last names or using a pre-trained BERT base model. Additionally, to detect a phone number (e.g., the pharmacy's phone number) in an entity text, activity 450 can include using a customized Regex for phone numbers (e.g., 10 continuous digits, 3 digits in parentheses followed by 3 or 7 digits, etc.) and determining that the entity text includes a phone number when the pattern for the entity text matches the customized Regex's. Moreover, for direction statements, activity 450 further can include using a Regex-based extraction to detect various direction components (e.g., a dosage (e.g., 1 tablet), a frequency (e.g.: in morning), etc.) in an entity text and determining the direction statement based on the direction component(s) detected.

In some embodiments, method 400 (and/or any of its constituent activities in FIG. 4) further can include one or more activities common for image processing. For example, method 400 additionally can perform one or more of binarization, skew correction, noise removal, thinning, and/or skeletonization, etc., using image-processing techniques generally known in the art, on one or more of the multiple partial images, before detecting the text boxes in activity 410 or determining the cross-image texts in activity 440, and so forth.

In many embodiments, after activity 450, method 400 can include other activities such as providing the one or more entities, as determined in activity 450, to a prescription filling system or subsystem, or to another system or a database. When provided to a prescription filling system or subsystem, the information from the one or more entities (e.g., the one or more words or word groups, drug name(s), drug dosage(s), name(s), entity value(s), etc.) can be used to fill, verify, or otherwise respond to prescription order for a patient or other customer.

Figure 5:
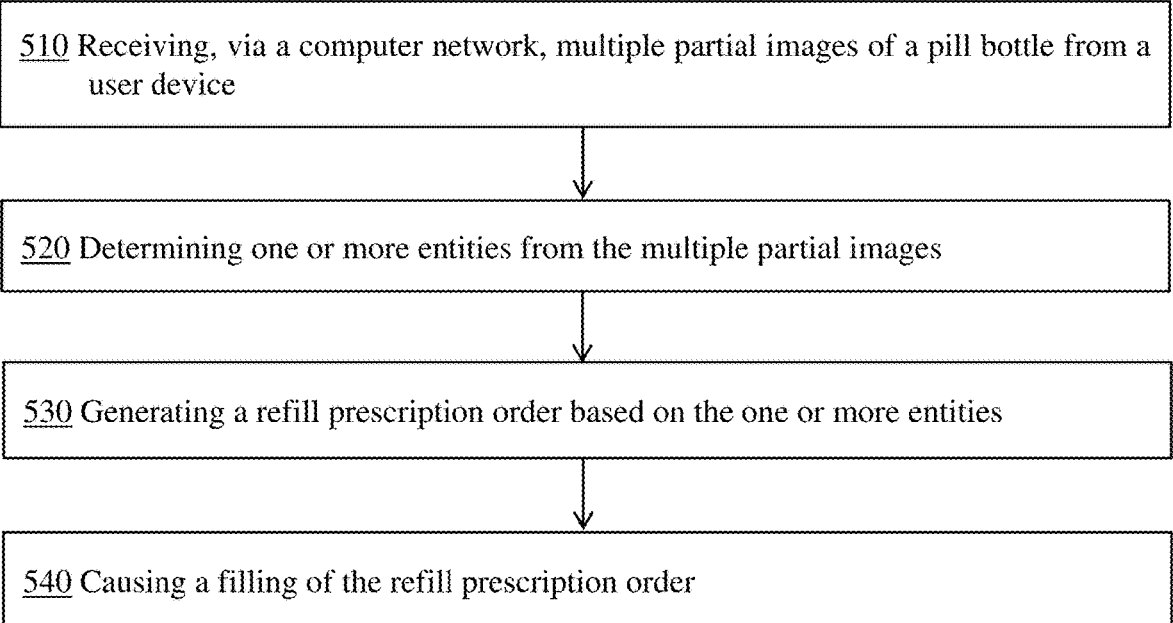
FIG. 5 illustrates a block diagram of a method for filling a refill prescription ordered online based on entities extracted from multiple partial images of a pill bottle, according to an embodiment.

Turning to the next drawing, FIG. 5 illustrates an activity diagram of a method 500 for filling a refill prescription ordered online based on entities extracted from multiple partial images of a pill bottle, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3) or system 310 (FIG. 3) (including one or more of its elements, modules, and/or systems, such as ML module 3110 (FIG. 3)) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as system 300 (FIG. 3) or system 310 (FIG. 3). The processor(s) can be similar or identical to the processor(s) described above with respect to computer system 100 (FIG. 1).

Referring to FIG. 5, method 500 can include an activity 510 of receiving, via a computer network (e.g., computer network 340 (FIG. 3)), multiple partial images of a pill bottle from a user device (e.g., user device(s) 320 (FIG. 3)) for a patient. The multiple partial images can be similar to the multiple partial images described above, such as being partially overlapped so that all of the texts are shown in one or two of the multiple partial images.

In many embodiments, method 500 further can include an activity 520 of determining one or more entities from the multiple partial images. The one or more entities can include prescription-related information, including the patient's name, the drug's name, the dosage or quantity, etc. Activity 520 can include one or more activities, processes, and/or activities similar or identical to the one or more activities of method 400 (FIG. 4).

In a number of embodiments, method 500 additionally can include an activity 530 of generating a refill prescription order based on the one or more entities. The refill prescription order can include some or all of the one or more entities determined by activity 520 and arranged in a predefined format. In certain embodiments, before generating the refill prescription order, activity 530 further can include automatically validating or verifying the one or more entities based on any suitable methods (e.g., one or more predefined rules). For example, activity 530 can include verifying whether the dosage as determined in activity 520 is a valid value (e.g., in a predefined range) for the drug and/or whether the patient's name matches the system user's name, etc. In a few embodiments, activity 530 further can include transmitting the refill prescription order, via the computer network, to a computer (e.g., computer system 100 (FIG. 1)) for a system operator to approve the refill prescription order and/or to the user device for the patient to confirm the refill prescription order.

In many embodiments, after the refill prescription order is generated in activity 530, method 500 further can include an activity 540 of causing a filling of the refill prescription order. Activity 540 can cause the filling of the refill prescription order by any suitable approaches. For example, activity 540 further can include: (a) transmitting, via the computer network, the refill prescription order to a computing device (e.g., computer system 100 (FIG. 1)) for a pharmacist; (b) determining a pick-up date and time (with or without the pharmacist's approval); and (c) transmitting, via the computer network, a notice about the pick-up date and time to the user device for the patient. In another example, instead of arranging pick-up, activity 540 can provide in a notice to the patient an estimated date and time the prescription drugs may arrive and/or a subsequent notice(s) with tracking information for the mailed prescription drugs. In embodiments where an automatic filling system (e.g., a pharmacy automation system) is used, causing the filling of the refill prescription order further can include automatically filling the refill prescription order, arranging a pickup of the drugs by a carrier (e.g., United States Postal Services) or the patient, and so forth.

In a few embodiments, method 500 further can include one or more additional or alternative activities, processes, and/or activities. For example, method 500 also can include automatically determining a payment method and/or verifying insurance information for the refill prescription order generated in activity 530 based on the system user's profile information.

Various embodiments can include a system for determining a conversational context for a conversational input. The system can include one or more processors and one or more non-transitory computer-readable media storing computing instructions that, when run on the one or more processors, cause the one or more processors to perform certain operations. The operations can include detecting respective one or more text boxes in each of multiple partial images of a text-bearing area. The operations further can include determining respective one or more edge text boxes of the respective one or more text boxes in each of overlapping partial images of the multiple partial images, wherein each of the respective one or more edge text boxes comprise a respective incomplete text. The operations also can include matching one or more pairs of corresponding edge text boxes from the respective one or more edge text boxes of two adjacent images of the overlapping partial images of the multiple partial images. The operations additionally can include determining cross-image texts in the one or more pairs of the corresponding edge text boxes. Moreover, the operations can include determining one or more entities in the text-bearing area based on entity texts of the cross-image texts and non-edge texts in respective one or more non-edge text boxes of the respective one or more text boxes in the multiple partial images.

Various embodiments further include a computer-implemented method including detecting respective one or more text boxes in each of multiple partial images of a text-bearing area. Further, the method can include determining respective one or more edge text boxes of the respective one or more text boxes in each of overlapping partial images of the multiple partial images, wherein each of the respective one or more edge text boxes comprise a respective incomplete text. Moreover, the method can include matching one or more pairs of corresponding edge text boxes from the respective one or more edge text boxes of two adjacent images of the overlapping partial images of the multiple partial images. The method also can include determining cross-image texts in the one or more pairs of the corresponding edge text boxes. In addition, the method can include determining one or more entities in the text-bearing area based on entity texts of the cross-image texts and non-edge texts in respective one or more non-edge text boxes of the respective one or more text boxes in the multiple partial images.

In many embodiments, the techniques described herein can provide a practical application and several technological improvements. The techniques described herein can provide text extraction from partial images of a text-bearing surface (e.g., a cylindrical surface of a bottle or a large sign) based on text stitching, without using complicated image-processing techniques to stitch the partial images into one. These techniques described herein can provide a significant improvement over conventional approaches. Conventional approaches generally use image stitching techniques to combine the partial images into a stitched image and use OCR techniques to determine the texts on the stitched image. Conventional image stitching techniques can be time-consuming while for some applications or purposes (e.g., NLP tasks such as extracting a drug name from the texts), the time used can be wasted because the stitched image can be of no use after the texts in the stitched image are extracted. Further, due to the complication of image stitching techniques and imperfections that are common in a stitched image, some texts, in particular the texts in the overlapped or stitched areas, can become unrecognizable. As such, the techniques described herein improve the technologies by providing more effective and less time-consuming approaches for text extraction.

Although text extraction based on text stitching has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIGS. 4-5 may include different procedures, processes, and/or activities and be performed by many different modules, in many different orders. As another example, the modules, elements, and/or systems within system 300 or system 310 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising one or more processors and one or more non-transitory computer-readable media storing computing instructions that, when run on the one or more processors, cause the one or more processors to perform operations comprising:

detecting respective one or more text boxes in each of multiple partial images of a text-bearing area;

determining respective one or more edge text boxes of the respective one or more text boxes in each of overlapping partial images of the multiple partial images, wherein each of the respective one or more edge text boxes comprise a respective incomplete text;

matching one or more pairs of corresponding edge text boxes from the respective one or more edge text boxes of two adjacent images of the overlapping partial images of the multiple partial images;

determining cross-image texts in the one or more pairs of the corresponding edge text boxes; and determining one or more entities in the text-bearing area based on entity texts of the cross-image texts and non-edge texts in respective one or more non-edge text boxes of the respective one or more text boxes in the multiple partial images.

2. The system in claim 1, wherein detecting the respective one or more text boxes in each of the multiple partial images further comprises:

detecting respective characters in each of the multiple partial images;

determining small characters of the respective characters in each of the multiple partial images, wherein each of the small characters comprises a respective font size less than a respective font-size threshold for each of the multiple partial images;

masking the small characters from each of the multiple partial images; and after masking, determining the respective one or more text boxes for remaining characters of the respective characters that are not masked in each of the multiple partial images.

3. The system in claim 2, wherein detecting the respective characters in each of the multiple partial images further comprises:

converting each of the multiple partial images into a respective binary image; and detecting a respective character contour in the respective binary image for each of the respective characters.

4. The system in claim 3, wherein determining the small characters of the respective characters in each of the multiple partial images further comprises:

determining a respective font size of each of the respective characters based on the respective character contour for each of the respective characters; and determining the respective font-size threshold for each of the multiple partial images based on the respective font size of each of the respective characters in each of the multiple partial images.

5. The system in claim 1, wherein determining the respective one or more edge text boxes in each of the overlapping partial images of the multiple partial images further comprises:

detecting a respective incomplete text for each of the respective one or more edge text boxes based on a respective distance between the respective incomplete text and a side edge of each of the overlapping partial images of the multiple partial images.

6. The system in claim 1, wherein matching the one or more pairs of the corresponding edge text boxes from the respective one or more edge text boxes of the two adjacent images of the overlapping partial images of the multiple partial images further comprises:

extracting a respective key descriptor for each of the respective one or more edge text boxes of the two adjacent images; and determining whether a first edge text box of the respective one or more edge text boxes of a first partial image of the two adjacent images matches a second edge text box of the respective one or more edge text boxes of a second partial image of the two adjacent images based on a feature distance between the respective key descriptor for the first edge text box and the respective key descriptor for the second edge text box, wherein:

when the first edge text box, as determined, matches the second edge text box, one of the one or more pairs of the corresponding edge text boxes comprises the first edge text box and the second edge text box.

7. The system in claim 1, wherein determining the cross-image texts in the one or more pairs of the corresponding edge text boxes further comprises:

removing overlapping characters from the one or more pairs of the corresponding edge text boxes based on a respective matching prefix-suffix pair of each of the one or more pairs of the corresponding edge text boxes.

8. The system in claim 1, wherein:

determining the one or more entities further comprises determining one or more word groups based on the cross-image texts and the non-edge texts; and each of the entity texts comprises a corresponding word or one of the one or more word groups, as determined.

9. The system in claim 1, wherein determining the one or more entities further comprises one or more of:

(a) correcting one or more spelling errors in the entity texts; or (b) detecting one or more entity signals for the one or more entities based on one or more of:

a keyword or a pattern in each of the entity texts; or a machine learning module pre-trained to determine whether a text of the entity texts comprises an entity signal of the one or more entity signals; and determining one or more entity values for the one or more entities based on the one or more entity signals.

10. The system in claim 9, wherein determining the one or more entity values for the one or more entities further comprises:

performing a Regex-based extraction on the entity texts based on the one or more entity signals.

11. A computer-implemented method comprising:

detecting respective one or more text boxes in each of multiple partial images of a text-bearing area;

determining respective one or more edge text boxes of the respective one or more text boxes in each of overlapping partial images of the multiple partial images, wherein each of the respective one or more edge text boxes comprise a respective incomplete text;

matching one or more pairs of corresponding edge text boxes from the respective one or more edge text boxes of two adjacent images of the overlapping partial images of the multiple partial images;

determining cross-image texts in the one or more pairs of the corresponding edge text boxes; and determining one or more entities in the text-bearing area based on entity texts of the cross-image texts and non-edge texts in respective one or more non-edge text boxes of the respective one or more text boxes in the multiple partial images.

12. The computer-implemented method in claim 11, wherein detecting the respective one or more text boxes in each of the multiple partial images further comprises:

detecting respective characters in each of the multiple partial images;

determining small characters of the respective characters in each of the multiple partial images, wherein each of the small characters comprises a respective font size less than a respective font-size threshold for each of the multiple partial images;

masking the small characters from each of the multiple partial images; and after masking, determining the respective one or more text boxes for remaining characters of the respective characters that are not masked in each of the multiple partial images.

13. The computer-implemented method in claim 12, wherein detecting the respective characters in each of the multiple partial images further comprises:

converting each of the multiple partial images into a respective binary image; and detecting a respective character contour in the respective binary image for each of the respective characters.

14. The computer-implemented method in claim 13, wherein determining the small characters of the respective characters in each of the multiple partial images further comprises:

determining a respective font size of each of the respective characters based on the respective character contour for each of the respective characters; and determining the respective font-size threshold for each of the multiple partial images based on the respective font size of each of the respective characters in each of the multiple partial images.

15. The computer-implemented method in claim 11, wherein determining the respective one or more edge text boxes in each of the overlapping partial images of the multiple partial images further comprises:

detecting a respective incomplete text for each of the respective one or more edge text boxes based on a respective distance between the respective incomplete text and a side edge of each of the overlapping partial images of the multiple partial images.

16. The computer-implemented method in claim 11, wherein matching the one or more pairs of the corresponding edge text boxes from the respective one or more edge text boxes of the two adjacent images of the overlapping partial images of the multiple partial images further comprises:

extracting a respective key descriptor for each of the respective one or more edge text boxes of the two adjacent images; and determining whether a first edge text box of the respective one or more edge text boxes of a first partial image of the two adjacent images matches a second edge text box of the respective one or more edge text boxes of a second partial image of the two adjacent images based on a feature distance between the respective key descriptor for the first edge text box and the respective key descriptor for the second edge text box, wherein:

when the first edge text box, as determined, matches the second edge text box, one of the one or more pairs of the corresponding edge text boxes comprises the first edge text box and the second edge text box.

17. The computer-implemented method in claim 11, wherein determining the cross-image texts in the one or more pairs of the corresponding edge text boxes further comprises:

removing overlapping characters from the one or more pairs of the corresponding edge text boxes based on a respective matching prefix-suffix pair of each of the one or more pairs of the corresponding edge text boxes.

18. The computer-implemented method in claim 11, wherein:

determining the one or more entities further comprises determining one or more word groups based on the cross-image texts and the non-edge texts; and each of the entity texts comprises a corresponding word or one of the one or more word groups, as determined.

19. The computer-implemented method in claim 11, wherein determining the one or more entities further comprises one or more of:

(a) correcting one or more spelling errors in the entity texts; or (b) detecting one or more entity signals for the one or more entities based on one or more of:

a keyword or a pattern in each of the entity texts; or a machine learning module pre-trained to determine whether a text of the entity texts comprises an entity signal of the one or more entity signals; and determining one or more entity values for the one or more entities based on the one or more entity signals.

20. The computer-implemented method in claim 19, wherein determining the one or more entity values for the one or more entities further comprises:

performing a Regex-based extraction on the entity texts
based on the one or more entity signals.

* * * * *